Figure 1:
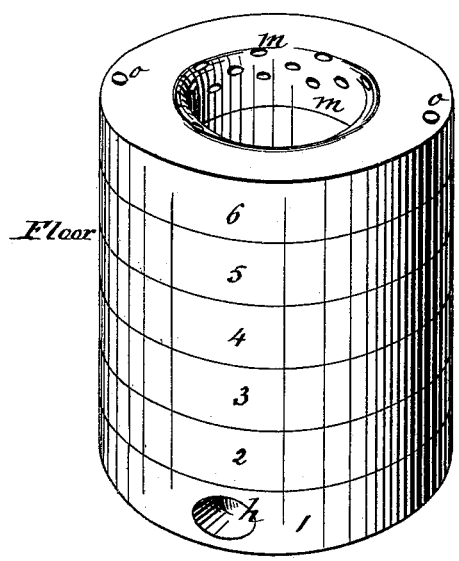

D. BENNETT.
GLASS-FURNACE.

No. 191,507.    Patented May 29, 1877.

Witnesses
Ewell A. Dick
E. E. Masson

Inventor
Daniel Bennett by
A. Pollok
his attorney.

UNITED STATES PATENT OFFICE.

DANIEL BENNETT, OF BALDWIN TOWNSHIP, ALLEGHENY COUNTY, PA.

IMPROVEMENT IN GLASS-FURNACES.

Specification forming part of Letters Patent No. 191,507, dated May 29, 1877; application filed May 11, 1877.

*To all whom it may concern:*

Be it known that I, DANIEL BENNETT, of Baldwin township, Allegheny county, Pennsylvania, have invented certain new and useful Improvements in Glory-Hole and other Glass-Furnaces, of which the following is a full, clear, and exact description.

My invention relates to the construction of furnaces used in the manufacture of glassware, and has particular reference to the means whereby the products of combustion of such furnaces are more thoroughly consumed, producing intense heat, and consuming all carbonaceous and other volatile impurities, which, for certain operations in the manufacture of glass, is of great importance.

In glass-furnaces, where the material to form the glass is melted in pots, one of the objects to be attained is economy of fuel, while in glory-hole furnaces, in addition to the saving of fuel, it is all-important to subject the formed glass article for a short time to the action of intense heat, in order to "fire-polish" the same, as the finishing process is termed. Such fire-polishing should be effected in a medium free from impurities which generally accompany products of combustion.

By my invention it is proposed to consume such impurities by creating intense heat, as before stated.

In the description which I am about to give I shall confine myself to a glory-hole furnace, it being, however, understood that the same means may be employed with like advantages in glass-furnaces of any description, subject to modifications which are obvious to glass manufacturers and others skilled in the art.

Glory-hole furnaces as heretofore constructed consisted of a circular or polygonal furnace-body having in its center, on a level, or thereabout, with the floor, a fire-grate, under which an ash-pit and air-supply passage were provided. The furnace-body had a flat arched top, and the sides were provided with a number of arched openings called "glory-holes," through which the articles to be finished were introduced by the operator.

The products of combustion issued through the glory-holes, and were carried through a flue or chimney which surmounted the whole structure. Partitions were sometimes used between the different glory-holes.

Such glory-hole furnaces have been used for many years. They were objectionable principally on account of the expense of fuel, requiring the purest kind of coal, giving out as little of the obnoxious gases and vapors as possible. They were also objectionable because of the imperfect combustion of the smoke and other matters liable to be carried with it. Also, because such furnace it was found necessary to work with powerful draft, which carried with it fine particles of the fuel which adhered to the glass, and could not be detached without defacing the glassware.

By my furnace I have obviated these objections, and I have attained results in the manufacture of glassware which to my knowledge have never been accomplished heretofore.

Figure 2:
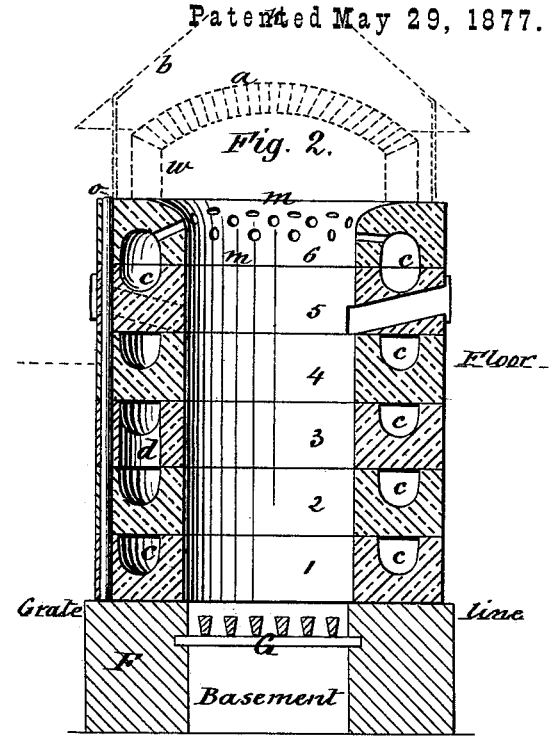
Figure 3:
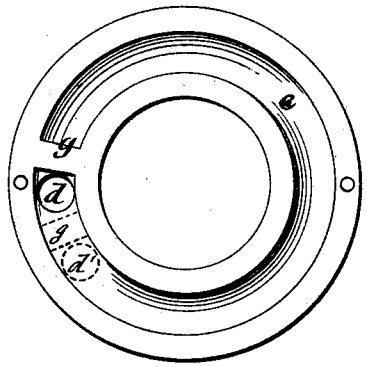
Figure 4:
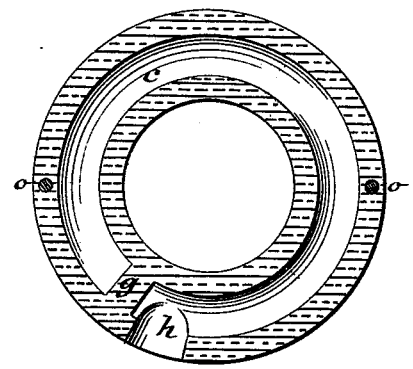

In the accompanying drawing I have shown such a furnace, or the essential parts thereof, in Figure 1, which represents a perspective view of a glory-hole furnace or lining of such furnace. Fig. 2 represents a vertical sectional view of the same, and I have shown it in its proper relation with the other parts of such furnace. Fig. 3 is a plan view of one of the sections of the lining, and Fig. 4 a horizontal section of the lowermost section.

The body of the furnace consists of a number of annular horizontal furnace-sections, mounted or built one upon the other to form a cylindrical structure, which is established upon a foundation, F, four or five feet in depth under the floor of the glass-house, and projecting from said floor the usual height, say, three feet, which is found to be the convenient working height.

In the drawings the furnace is shown to be composed of six sections, which I have numbered, respectively, from one to six. These are made of fire-clay, each section having an annular groove or channel, $c$, and an outlet, $d$, or passage of communication with a similar channel in the adjoining section, and a partition, $g$, whereby the communication between the different channels is established in such a manner as that in order to pass from one channel into the other it is necessary to follow the whole length of the channel in each section before it can enter the next adjoining. In other words, the vertical passage or communication with the lower section is directly contiguous the partition on one side thereof, while the passage or communication with the next upper section is directly contiguous the partition on the other side thereof, as shown in Fig. 3, $g$ being the partition, $d$ the one and $d'$ the other passage of communication. The lowermost section, however, has its passage or communication with the outside through the outer wall of the annulus, and thus communicates with the air in the basement of the furnace. The uppermost section has the inner wall of the annulus perforated, and thus the uppermost channel is made to communicate with the interior of the furnace, as shown in Figs. 1 and 2 at $m$ $m$ $m$, &c.

In the drawings the several sections are shown united in their proper relations to each other by means of iron rods $o$, which pass through apertures in the several sections; but I prefer, in practice, instead of these iron rods, to incase the whole furnace in a sheet-iron casing, having found that there is no necessity for any special means to secure the adjustment of the sections. After they are placed in their proper positions they are not apt to be disturbed by any external or internal cause.

The furnace thus constructed upon the foundation, as before shown, and over the fire-grate G, which extends across the area of the furnace, is completed by the upper structure, which consists of a circular wall, $w$, pierced with the requisite number of glory-holes, and surmounted by a flat arch, $a$, such as is well known to glass manufacturers. Over the whole structure is the funnel-shaped arch or hood $b$ and flue $k$, to carry off the productions of combustion.

The operation of such furnace, it will be understood, is as follows: The grate is charged with fuel through feed-holes conveniently managed through the solid portion of one or more sections above the floor, as shown in Fig. 2.

The great depth at which the grate, with respect to the glory-holes, is situated, admits of a large body of fuel, which, being in a state of ignition and in contact with the lining or furnace-sections described, will heat the same to such a point that the air, which, entering at $h$, and following through the circular channels of sections 1, 2, 3, 4, and 5, will reach the channel in section 6 intensely heated, and issue through the openings $m$ in a spray, and impinge upon the column of products of combustion, which rise up through and from the incandescent mass of coal or other fuel in the furnace, and, there mingling with the products of combustion, produce a most intense white heat, due to the combustion of the gaseous fuel thus presented at a point where it is necessary to have such heat, in order to quickly and perfectly fire-polish the formed glassware.

It is not necessary to dwell upon the manner in which the fire-polishing is done, as that is well known in the art.

It will be understood that this form of lining is one of many forms which may be used with like effect, and which come within the scope of my invention. Thus, instead of horizontal channels communicating with each other by means of vertical channels on either side of partitions, the sections may be constructed with one or more spirally-formed channels, so that the channels in the one shall be the continuation of the channels in the other.

Having thus described my invention, and the manner in which the same is or may be carried into effect, what I claim, and desire to secure by Letters Patent, is—

1. A glory-hole or other glass-furnace composed entirely or in part of sections having channels intercommunicating or otherwise equivalently formed, so as to receive air at the bottom and convey the same once or more times around the body of the fire, and discharge the same at the top in a highly-heated state to mingle with the products of combustion, substantially as and for the purposes set forth.

2. In combination with a furnace constructed with intercommunicating circuitous channels, as described, a grate located below the floor at a depth greater than the height of the furnace above the floor, substantially as shown and described.

In testimony whereof I have hereunto signed my name this 5th day of May, A. D. 1877.

DANIEL BENNETT.

Witnesses:
 JOSEPH KULING,
 P. S. POLLOCK.